(12) United States Patent
Eriksen

(10) Patent No.: US 12,085,287 B2
(45) Date of Patent: Sep. 10, 2024

(54) PUMP SYSTEM

(71) Applicant: GRUNDFOS HOLDING A/S, Bjerringbro (DK)

(72) Inventor: Gert Friis Eriksen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 1058 days.

(21) Appl. No.: 16/997,651

(22) Filed: Aug. 19, 2020

(65) Prior Publication Data
US 2021/0055003 A1   Feb. 25, 2021

(30) Foreign Application Priority Data

Aug. 21, 2019  (EP) .................................... 19192842

(51) Int. Cl.
| | |
|---|---|
| *F24D 3/00* | (2022.01) |
| *F04D 7/00* | (2006.01) |
| *F04D 29/00* | (2006.01) |
| *F24S 10/00* | (2018.01) |
| *F24S 40/00* | (2018.01) |
| *F24S 80/00* | (2018.01) |
| *G01N 29/024* | (2006.01) |

(52) U.S. Cl.
CPC ............... *F24D 3/005* (2013.01); *F04D 7/00* (2013.01); *F04D 29/007* (2013.01); *F24S 10/00* (2018.05); *F24S 40/00* (2018.05); *F24S 80/00* (2018.05); *G01N 29/024* (2013.01); *G01N 2291/02809* (2013.01)

(58) Field of Classification Search
CPC . F24D 3/005; F24S 40/00; F24S 80/00; F24S 10/00; F04D 7/00; G01N 29/024

USPC ......................................................... 126/646
See application file for complete search history.

(56) References Cited

U.S. PATENT DOCUMENTS

| | | | |
|---|---|---|---|
| 2008/0289400 A1* | 11/2008 | Quist .................... | G01N 11/16 73/1.02 |
| 2013/0272898 A1* | 10/2013 | Toh ....................... | E21B 47/008 417/44.1 |
| 2017/0350747 A1* | 12/2017 | Oh ......................... | G01N 33/22 |

FOREIGN PATENT DOCUMENTS

| | | |
|---|---|---|
| CN | 208 504 772 U | 2/2019 |
| CN | 208 607 112 U | 3/2019 |
| CN | 208 766 103 U | 4/2019 |
| DE | 10 2015 222909 A1 | 5/2017 |
| EP | 2 072 970 A1 | 6/2009 |
| EP | 2 746 742 A1 | 6/2014 |
| KR | 101 546 805 B1 | 8/2015 |

* cited by examiner

*Primary Examiner* — Vivek K Shirsat
(74) *Attorney, Agent, or Firm* — McGlew and Tuttle, P.C.

(57) ABSTRACT

A pump (2) system includes a pump, a sensor (22; 28) arranged in or at a flow path (14), and a concentration measurement device measuring a concentration in liquid inside the flow path (14). The concentration measurement device includes the sensor (22; 28), as a concentration sensor, connected to an evaluation device (26) for evaluating readings of the sensor (22; 28). The evaluation device (26) is connected to a further signal source (20; 24), providing at least one further parameter, and is configured to carry out an evaluation of the reading of the sensor (22; 28), taking into account the further parameter provided by the further signal source (20, 24) to output the concentration in the liquid. A solar heating system includes the pump system.

17 Claims, 8 Drawing Sheets

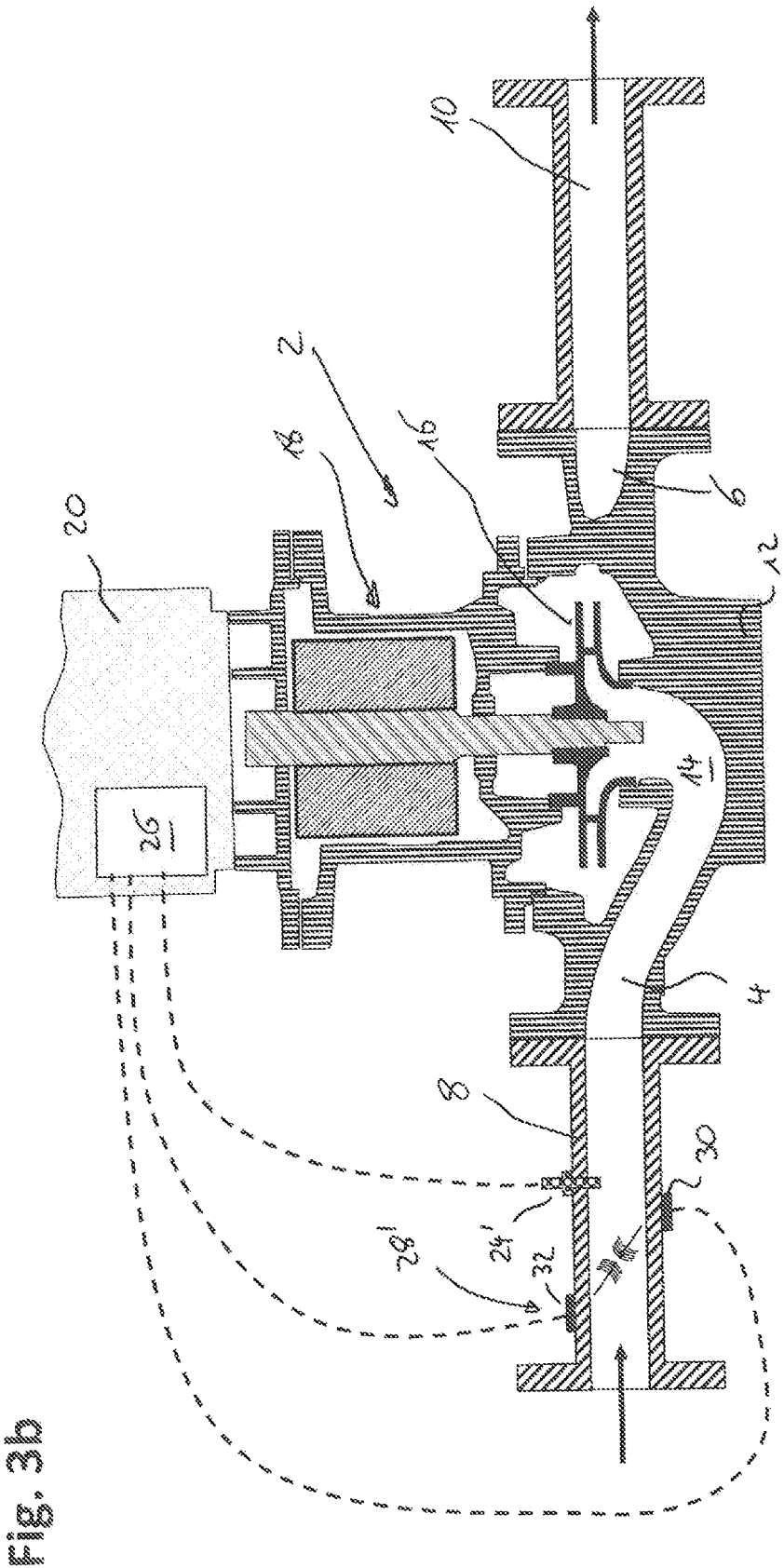

PUMP SYSTEM

CROSS REFERENCE TO RELATED APPLICATIONS

This application claims the benefit of priority under 35 U.S.C. § 119 of European Application 19 192 842.3, filed Aug. 21, 2019, the entire contents of which are incorporated herein by reference.

TECHNICAL FIELD

The invention refers to a pump system with at least one pump and one sensor arranged in or at a flow path through the pump, as well as to a solar heating system comprising such a pump system.

TECHNICAL BACKGROUND

In the art there are known hydraulic systems or pump systems including a pump for feeding a liquid, wherein it is appreciated to detect certain properties of the liquid. For example, there are known systems in which a pump system provides a circulation of a liquid inside the system. This may, for example, be heating systems, preferably solar heating systems. In those systems it may be necessary to detect certain properties of the liquid which is pumped by the pump system. For example, it may be necessary to detect a concentration of glycol in a solar heating system. It is difficult to detect those properties under all operational conditions of the pump system.

SUMMARY

In view of this it is an object of the invention to provide a pump system with a pump and at least one first sensor for detecting a certain property of the liquid to be pumped which allows a more reliable and exact measurement of that property.

The pump system according to the invention comprises at least one pump and at least one flow path for a liquid, wherein there is arranged at least one first sensor in or at that flow path to detect a parameter or characteristic of the liquid inside that flow path.

According to the invention the pump system comprises a concentration measurement device measuring a concentration in the liquid inside that flow path as the at least one characteristic or property mentioned before. This concentration measurement device comprises the afore mentioned at least one first sensor arranged in or at said flow path. This means, the sensor is provided to detect a value or parameter representing a concentration. Furthermore, the concentration measurement device comprises an evaluation device for evaluating the sensor signals or readings provided by the at least one first sensor. That at least one first sensor is a concentration sensor, i.e. a sensor detecting a concentration or a value or parameter representing a concentration or being dependent on a concentration. This at least one first sensor is connected to the evaluation device such that the evaluation device receives the signals or readings from the sensor for evaluating the readings of that at least one first sensor. According to the invention said evaluation device is connected to at least one further signal source providing at least one further value or parameter, respectively. That evaluation device is configured in a manner such that it carries out the evaluation of the at least one reading of that at least one first sensor, i.e. the concentration sensor, whilst taking into account the at least one further parameter provided by the further signal source. In this evaluation the evaluation device evaluates the concentration to be detected in the liquid and outputs a respective or dependent signal or value. To consider a further signal source when evaluating the concentration on basis of the reading of the first sensor has the advantage, that for example changes of the operating condition which may have an influence upon the reading of the concentration sensor and which could adulterate the result of the measurement can be detected by use of the second signal source and be taken into account. Thereby, the reading from the first sensor may for example be compensated on basis of the at least one further parameter provided by the second signal source or the evaluation could be suspended during certain operational conditions indicated by the at least one further parameter. The further parameter thus for example can be a parameter which is characteristic for a certain operating condition or may characterize changes of the operating conditions and/or ambient conditions. This permits the changes of the reading of the at least one first sensor, i.e. the concentration sensor to be compensated or corrected on the basis of the parameters provided by the further signal source, so that a more precise measurement of the concentration becomes possible. In particular, readings of the first sensor which due to certain operating conditions are likely imprecise or wrong can be omitted for the evaluation. It has to be understood that there could be more than one further signal source.

The concentration sensor may be configured such that it is immersed into the liquid or that it detects the concentration from the outside, for example in a contact free manner, e.g. through a separating wall. For example, the first sensor may be an ultrasound sensor, and optical sensor or a capacitive sensor for detecting a concentration. Furthermore, a combination of those sensors could be used.

According to a possible embodiment of the invention the at least one further signal source may be at least one further or second sensor, which preferably is arranged in or at that flow path such that it detects at least one further parameter or characteristic of the liquid inside that flow path. According to a preferred embodiment that at least one second sensor may be a temperature sensor detecting the temperature of the liquid inside that flow path or a sensor which detects at least one temperature dependent parameter of the fluid inside the flow path. Also another type of second signal source could be used providing a temperature signal or a temperature dependent signal representing the temperature of the fluid inside the flow path. A temperature-dependent parameter can be an arbitrary parameter which is dependent on the temperature, in particular being proportional to the temperature. Such a temperature-dependent parameter permits an indirect temperature detection. The consideration of the temperature of the liquid by the evaluation device for example allows to suspend the evaluation of the concentration if the temperature is too high or too low. Furthermore, a temperature compensation could be carried out by the evaluation device.

Preferably the at least one first and that at least one second sensor are arranged at the same position along the flow direction of the flow path and further preferably the at least one first sensor and the at least one second sensor may form an integrated sensor. By this arrangement it is ensured that the temperature of the liquid is detected at substantially the same position at which the concentration is detected by use of the first sensor.

According to a further possible embodiment said evaluation device is connected to at least two further signal sources providing two further parameters and that evaluation device is configured in a manner such that it carries out an evaluation of at least one reading of that at least one first sensor whilst taking into account the at least two further parameters provided by the further signal sources. The further signal sources may be additional sensors and/or are the control devices. For example, one further parameter may be a temperature signal as discussed above and the second further parameter for example may be a signal representing an operating condition of the pump, for example whether the pump is running and/or the speed of the pump. By use of such two additional parameters or signals for example the evaluation of the reading of the first sensor can be suspended if the temperature is outside a predefined range and if the pump is not running in a predefined operational condition, for example with a speed inside a predefined range of rotational speeds. By this, the measurement of the concentration can be improved further. In addition or alternatively, the further parameter may be a time, in particular the day time so that the evaluation for example can be carried out only during night time. Furthermore, the time may be a running time of the pump, for example the total running time or the running time since the last stop or change of speed of the pump. This, would be advantageous for example for a solar heating system, since during night time the temperatures are reduced since the solar heating system is not working. This may result as an improved measurement of concentration.

According to a preferred embodiment said flow path as mentioned above is part of a flow path through the pump for the liquid pumped by the pump. This design allows to detect a concentration, in particular a concentration of a substance or compound inside the liquid which is pumped by the pump. Preferably the at least one first sensor and/or further second sensors are arranged inside the pump, so that the pump can offer an integrated concentration measurement system.

According to a preferred embodiment that flow path may be arranged inside a pump housing of that pump, the pump housing preferably is the part of the pump containing at least one impeller of the pump. This design allows to directly arrange the sensors inside the pump housing without need of additional conduits for the liquid to bring the liquid into contact with the sensors.

As mentioned above the first sensor preferably is an ultrasound sensor, an optical sensor or a capacitive sensor. Regarding an ultrasound sensor, an ultrasound generator, for example a piezo element, is preferably configured and arranged at the flow path such that it sends an ultrasound signal into the flow path, which signal then being reflected at an opposite wall. The reflected signal is received by a measuring element as a main part of the sensor, which preferably likewise can be formed by the sound generator or however be integrated with this into a single sensor unit. The speed of sound and hence the received reflected ultrasound signal changes given a change of the concentration so that concentration changes can be ascertained by the evaluation device. The speed of sound is, however, not only dependent on the concentration, but likewise on the temperature of the liquid, which is why it is preferably to also detect the temperature and to consider the temperature in the evaluation device. The described ultrasound sensor can, therefore, be a sensor which operates according to the reflection principle. Alternatively however, one can also use an ultrasound sensor with a transmitter arranged at one side and a receiver at the opposite side of the flow path, without the signal being reflected.

According to a further preferred embodiment the at least one first sensor can be an ultrasound sensor being a combined flow and concentration sensor. This allows with a single sensor to detect both, concentration of a compound or substance inside the liquid and the flow in the flow path. For such a combined sensor, preferably, also the evaluation of the flow is done by the evaluation device. Also, for the flow detection further parameters as provided by the further signal sources can be used to improve the measurement.

According to a further possible embodiment the evaluation device is configured in a manner such that it carries out an evaluation of a reading of the at least one first sensor only when the at least one second parameter is below a predefined maximum limit value and/or is above a predefined minimum limit value. The limit value for example may be a temperature limit so that the evaluation of the reading of the first sensor is carried out only if the temperature of the liquid is below a predefined maximum temperature and/or above a predefined minimum temperature. I.e. for example, the concentration measurement can be skipped above a certain operating temperature, at which reliable measuring results can no longer be expected. Alternatively or in addition, the concentration measurement for example may be skipped at temperatures which are too low.

According to a possible embodiment of the invention, the evaluation device is configured in a manner such that on the basis of the reading of the first sensor taking into consideration the further parameter received from the further signal source it outputs an alarm signal if the evaluated concentration reaches a predefined concentration limit. In a solar heating system there may be for example an alarm if the glycol concentration in the liquid becomes too low. Additionally, the evaluation device may be configured to emit a switching or control signal which is received by a control device and for example be used to switch the pump into continuous operation on the basis of this signal, for example to prevent freezing or further defects. In a further example the system may be emptied of fluid if the concentration is above or below a predefined threshold. Or the pump gets turned off.

As mentioned before the further parameter or signal can be used to skip the evaluation of the reading of the first sensor under certain conditions. According to a further preferred embodiment, the evaluation device can be configured such that it acquires readings of the first sensor at different points in time and forms an average value of the detected readings as a characteristic value. Particularly preferably, the evaluation device can thereby be configured such that it forms a rolling average value or an average value over a certain time span. Thereby, according to a further preferred embodiment the evaluation device may be configured in a manner such that on forming the average value, it weights the readings of the concentration sensor, i.e. the first sensor in dependence on the signal or parameter received from the at least one further signal source, for example on basis of a temperature reading received from a temperature sensor. Thus, on forming the average, for example concentration readings in operating conditions, in which are more accurate measurement of the concentration is to be expected, can be weighted higher than readings in operating conditions of the pump system, in which less accurate measurements are to be expected. For example, concentration readings which are detected at a lower temperature may be weighted higher than readings which are detected at a higher temperature. This is in particular preferred when using an ultrasound sensor as first sensor, since at lower temperatures the concentration changes lead to a greater change of the speed of sound through the liquid, resulting in a greater measuring accuracy. The speed difference becomes smaller at higher temperatures, so that greater measurement inaccuracies can be given in these regions. A different weighting of the readings may be effected for example according to a linear function or an inverse Sigmoid function. However, other mathematical functions can also be applied in order to achieve this. Basically, for example, monotonically descending functions can be used in certain temperature intervals, such as for example the previously mentioned linear functions and the inverse Sigmoid function. However, it is also possible to apply monotonically ascending functions in certain temperature regions, in particular at very low temperatures which lie close to the freezing point. A monotonically descending function can therefore be applied in a higher temperature range and a monotonically ascending function in a lower temperature range.

The pump preferably comprises an electric drive motor with control electronics, wherein that evaluation device is signal connected to that control electronics. Thus, the evaluation device can output signals to the control of the electric drive motor, for example to switch off the electric drive motor if for example the concentration exceeds or falls under a predefined limit value. In reverse direction the control of the electric drive motor may output parameters or signals to the evaluation device, for example as a further parameter for the evaluation of the readings of a first sensor. Thus the control of the electric drive motor can act as a further signal source as mentioned above. For example, the motor control may output the rotational speed of the pump and the evaluation device may consider the current speed when evaluating the reading from the first sensor, for example to skip the reading at certain speeds. Thus, preferably, the control electronics of the drive motor forms the further signal source outputting the at least one further parameter, wherein preferably that at least one further parameter is a parameter representing a temperature and/or an operational condition of the pump, preferably the speed of the pump or whether the pump is running or switched off.

According to a further preferred embodiment that evaluation device is arranged inside an electric housing containing control electronics of the pump or the electric drive motor of the pump. Further preferably, the evaluation device is integrated into the control electronics of the pump. This means the control electronics of the pump, in particular the control electronics of the electric drive motor, additionally act as evaluation device for evaluating the sensor signals in the afore described manner. This simplifies the pump system, since no additional electronics or only a few additional electronics are needed for the concentration measurement. It would also be possible to integrate at least parts or the entire electronics necessary for the concentration measurement, in particular the evaluation device, into a sensor housing, for example of the mentioned first sensor.

According to alternative embodiments further layouts and arrangements of the evaluation device are possible. It would be possible to build the evaluation device as a separate electronic device which may be arranged in the pump system and preferably connected to further control elements or control devices of the pump system. In particular such an evaluation device as a separate external device may be used to retrofit existing pumps or pump systems. It would be preferred to provide a communication interface in such evaluation device allowing the communication with the motor control as described above. In particular a communication interface of the evaluation device may be configured to allow a communication with existing interfaces of a motor control or pump control. Such a communication may be wired or wireless, for example via WIFI, Bluetooth or other communication methods. Also an optical or inductive communication would be possible. Such a communication interface may be configured to allow the exchange of signals and information between the motor or pump control and the evaluation device as mentioned before and explained in the following. Furthermore, it would be possible to carry out the evaluation device as a software module, preferably a software module which can be integrated into existing pumps or motor controls by a software update. A further alternative solution would be that the evaluation device is realized as a cloud-solution, i.e. as a software evaluation device running on a server connected to the sensors and preferably a pump control via network connection, in particular via the internet.

According to a further preferred embodiment the motor control and/or the evaluation device may be connected to at least one display or may include at least one display to display the evaluation or measurement results, as for example concentration values detected or evaluated, respectively. Furthermore, such display may show alarms or further information as necessary actions resulting from the detected concentration.

The at least one first sensor may be arranged on an outlet side or an inlet side of the pump. Depending on the position of the sensor the sensor may allow to detect further operational conditions of the pump, for example air bubbles or air inside the system.

As mentioned above, preferably, the at least one first sensor may be a concentration sensor configured to detect a glycol concentration inside the liquid, for example water. This may be used for solar heating systems containing glycol as antifreeze agent. However, it would also be possible to detect the concentration of different substances or compounds inside a liquid, in particular inside water. Generally, the concentration sensor may be configured to detect the concentration of a second fluid inside a first fluid in said flow path. For example, glycol may form the first fluid and the water concentration inside the glycol may be detected. However, also other fluid mixtures can be measured or evaluated in view of the concentration, in particular mixtures of more than two fluids. For example, further additives which are contained in a first fluid, in particular water may be detected to measure the concentration of these additives.

The pump of the pump system preferably is a centrifugal pump and in particular a circulator pump, preferably having a wet running electric drive motor. Such circulator pumps are used for example in heating systems, in particular solar heating systems or a cooling system.

The invention as described above would be further advantageous to be used in a closed system, for example a heating or cooling system. In such a system the speed of the pump may be used to determine the best time to measure. For this, the speed of the pump may be output by a pump control and received by the evaluation device as a further parameter and the evaluation device would set the points in time for contraction detection on basis of the speed of the pump. Such a pump may be a centrifugal or circulator pump as mentioned before.

A further possible application of the pump system as mentioned before would be a pump system for waste water. In a waste water pump system the evaluation device may evaluate or measure the concentration of a certain compound or substance or liquid inside the waste water pumped by the pump. In the application in a waste water system or in another open pump system there may be the problem that there may be air in the liquid to be pumped. If there are air bubbles in the liquid the concentration measurement may be difficult or inaccurate. By using a suitable further parameter indicating the presence of gas or air bubbles it would be possible to suspend the evaluation or measurement of the concentration until a stable flow of liquid has been reached. For example, as a further parameter the flow could be detected by a further sensor or the first sensor itself if it is a combined concentration and flow sensor. For example, the concentration measurement of the liquid is carried out only if a specific flow velocity is reached in the system. This may be evaluated by the evaluation device on basis of the further parameter received from the at least one further signal source.

Thus, the pump system preferably is part of a heating and/or cooling system and in particular part of a solar heating system. Furthermore also a solar heating system comprising at least one collector and a pump system according to the preceding description is subject of the present invention.

In the following the invention is described by example with reference to the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1b is a schematic cross sectional view of an alternative of the first embodiment according to FIG. 1a;

FIG. 2b is a schematic cross sectional view of an alternative of the second embodiment according to FIG. 2a;

FIG. 3b is a schematic cross sectional view of an alternative of the third embodiment according to FIG. 3a;

DESCRIPTION OF PREFERRED EMBODIMENTS

Figure 1A:
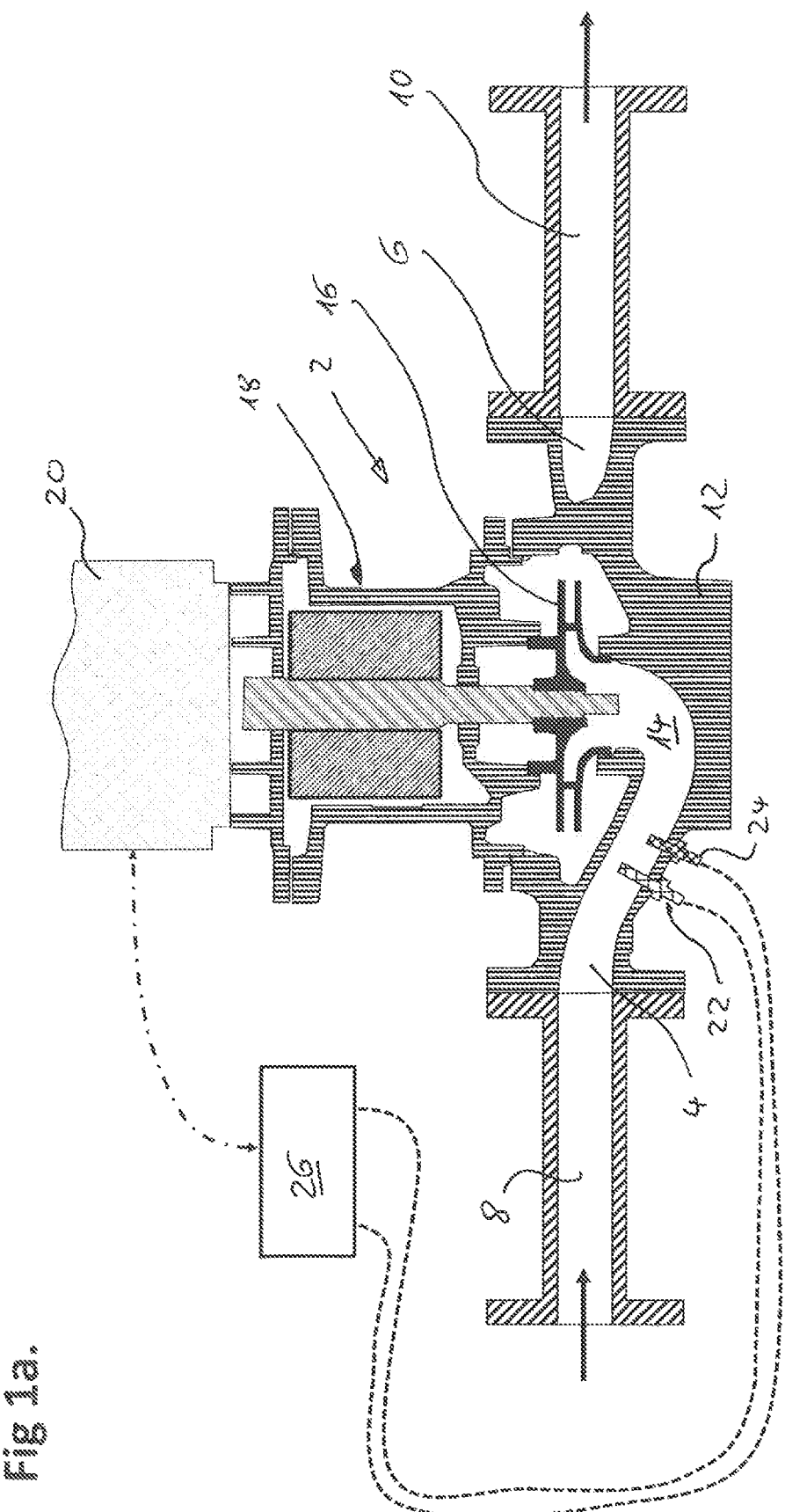
FIG. 1a is a schematic cross sectional view of a pump device according to a first embodiment of the invention.

Referring to the drawings, the pump device as shown in FIG. 1a comprises a pump 2 having an inlet 4 and an outlet 6. The inlet 4 is connected to an inlet conduit 8 and the outlet 6 is connected to an outlet conduit 10. The inlet conduit 8 and the outlet conduit 10 may be part of a hydraulic system as for example a heating system, in particular a solar heating system as for example shown in FIG. 4. The inlet 4 and the outlet 6 are arranged in a pump housing 12 defining a flow path 14 from the inlet 4 to the outlet 6. In the pump housing 12 there is arranged an impeller 16 inside the flow path 14 for pumping the liquid, for example water or a water mixture through the flow path 14. The impeller 16 is driven by an electric motor 18 which is arranged in a motor housing connected to the pump housing 12. The electric drive motor 18 preferably is a wet-running motor, but may be any suitable drive motor. The drive motor comprises a motor control or control device 20 in form of control electronics controlling the electric drive motor of the pump. The control device 20 in particular may comprise a speed regulator. For speed regulation there may be a frequency converter as part of the control device 20.

Into the pump system as shown in FIG. 1a there is integrated a system for concentration measurement inside the liquid pumped through the flow path 14, for example for detecting a glycol concentration in a water/glycol-mixture. This concentration measurement device comprises a first sensor 22 being a concentration sensor 22. Furthermore, there is arranged a temperature sensor 24 as a second sensor. The concentration sensor 22 and the temperature sensor 24 may be integrated into one sensor unit. In this embodiment the concentration sensor 22 and the temperature sensor 24 are arranged on the inlet side, i.e. upstream the impeller 16. However, it would also be possible that one of these two sensors or both are arranged on the outlet side, downstream the impeller 16, as for example shown in FIG. 3a. The concentration sensor 22 and temperature sensor 24 may be arranged inside the flow path 14 such that they are immersed into the fluid. However, preferably the sensors are configured for a contactless measurement so that the sensors 22 and 24 itself do not come into contact with the liquid inside the flow path 14, but measure the desired parameters from the outside. The concentration sensor 22 preferably is an ultrasonic sensor having an ultrasound source sending an ultrasound signal into the flow path 14 so that the signal is reflected on the opposite inner wall of the flow path. The reflected signal is detected by a detector integrated into the sensor 22. The concentration sensor 22 and the temperature sensor 24 are connected to an evaluation device 26 for evaluating the readings of the two sensors 22 and 24. The evaluation device 26 is outputting a concentration value and/or for example an alarm or switching signal dependent on the detected concentration. The evaluation device 26 is configured such that it can evaluate the reading from the concentration sensor 22 under consideration of the signal from the temperature sensor 24. For example, example, the evaluation of the concentration measurement is suspended or skipped if the detected temperature is too high or too low.

Furthermore, in this embodiment the evaluation device 26 is connected to the control device 20. For other embodiments there may be an alternative or additional connection or communication to other devices, like for example a valve. Furthermore, connection may be established via a network, the internet, a cloud or a similar way of communication. This may be a bidirectional communication such that the evaluation device 26 can receive a signal from the control device 20, for example whether the drive motor 18 is running or not. Furthermore, it would be possible to output a speed signal from the control device 20 to the evaluation device 26. Also these signals can be considered by the evaluation device 26 when evaluating the reading from the concentration sensor 22. For example, the evaluation of the concentration reading from the concentration sensor 22 can be carried out only during certain operational conditions, for example during a certain speed of the drive motor 18 or if the drive motor 18 is switched off. Furthermore, it would be possible to have a communication in the opposite direction such that the evaluation device 26 sends control signals to the motor control 20, for example to bring the drive motor 18 into a desired operational condition for the concentration measurement, for example to set a certain rotational speed of the drive motor 18 or to switch off the drive motor 18 for a measurement. Furthermore, the evaluation device 16 may output a concentration value or a switching signal to the control device 20, for example to switch off the drive motor 18 if a predefined concentration value is exceeded. Additionally or alternatively the control device 20 may give an alarm signal to an operator if a certain concentration value is detected.

Figure 1B:
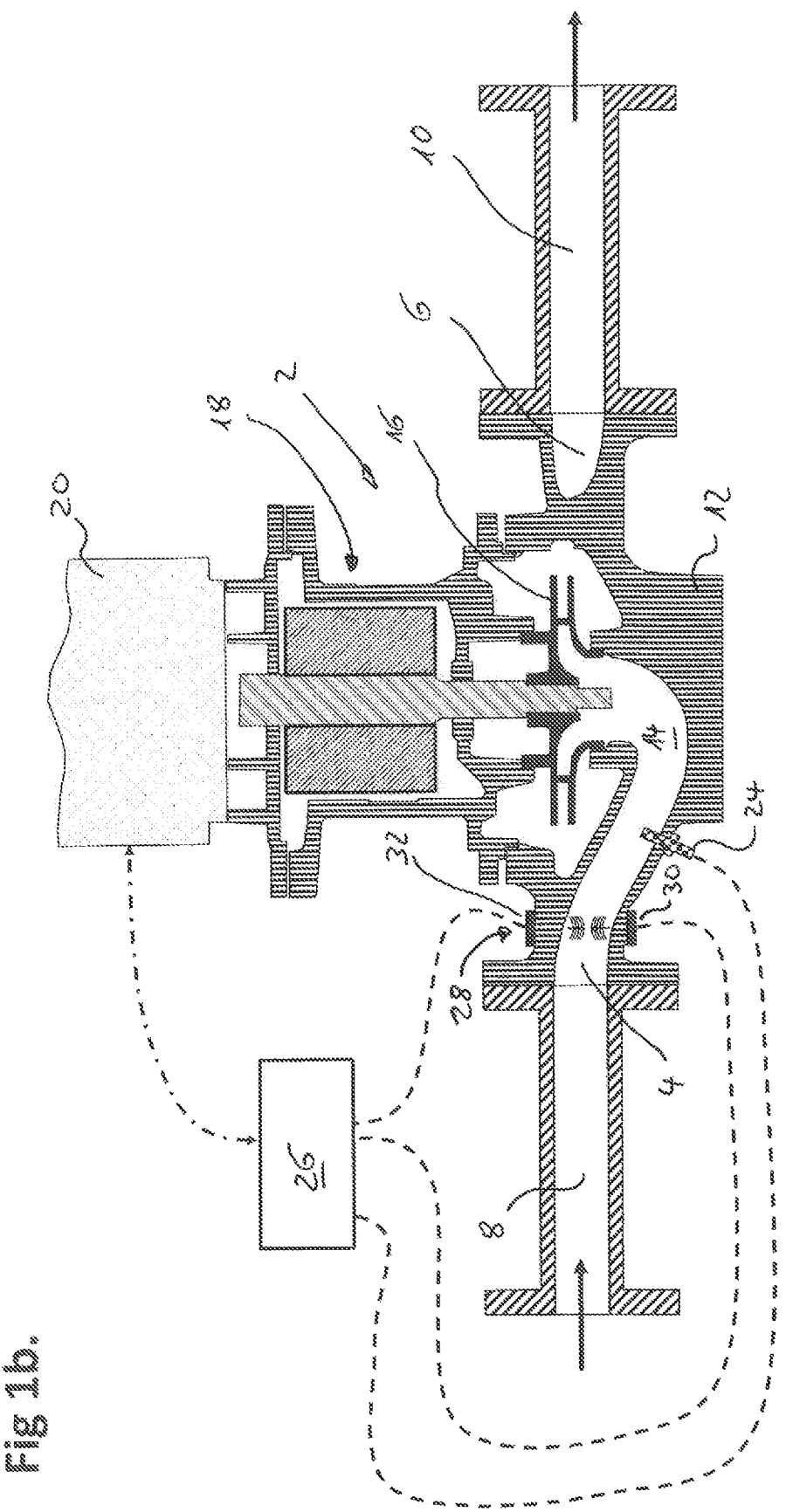

FIG. 1b shows an alternative solution of the first embodiment in which the sensor 28 is an alternative to the concentration sensor 22 as described before. Differing from the design of the concentration sensor 22 the sensor 28 is configured having a transmitter 30 arranged on one side of the flow path and a receiver 32 arranged on the opposite side. The transmitter 30 sends out an ultrasound signal into the liquid in the flow path 14 and the receiver 32 detects the signal which has passed the flow path 14.

The ultrasound sensors 22 and/or 28 may in addition also measure the flow inside the flow path 14 so that they form a combined flow/concentration sensor. Both, the evaluation of the flow and the concentration may be carried out by the evaluation device 26. For example, the flow reading of the sensor 22 or 28 may be input into the evaluation device 26 such that the detected flow can be regarded as a further parameter for the evaluation of the concentration.

Figure 2A:
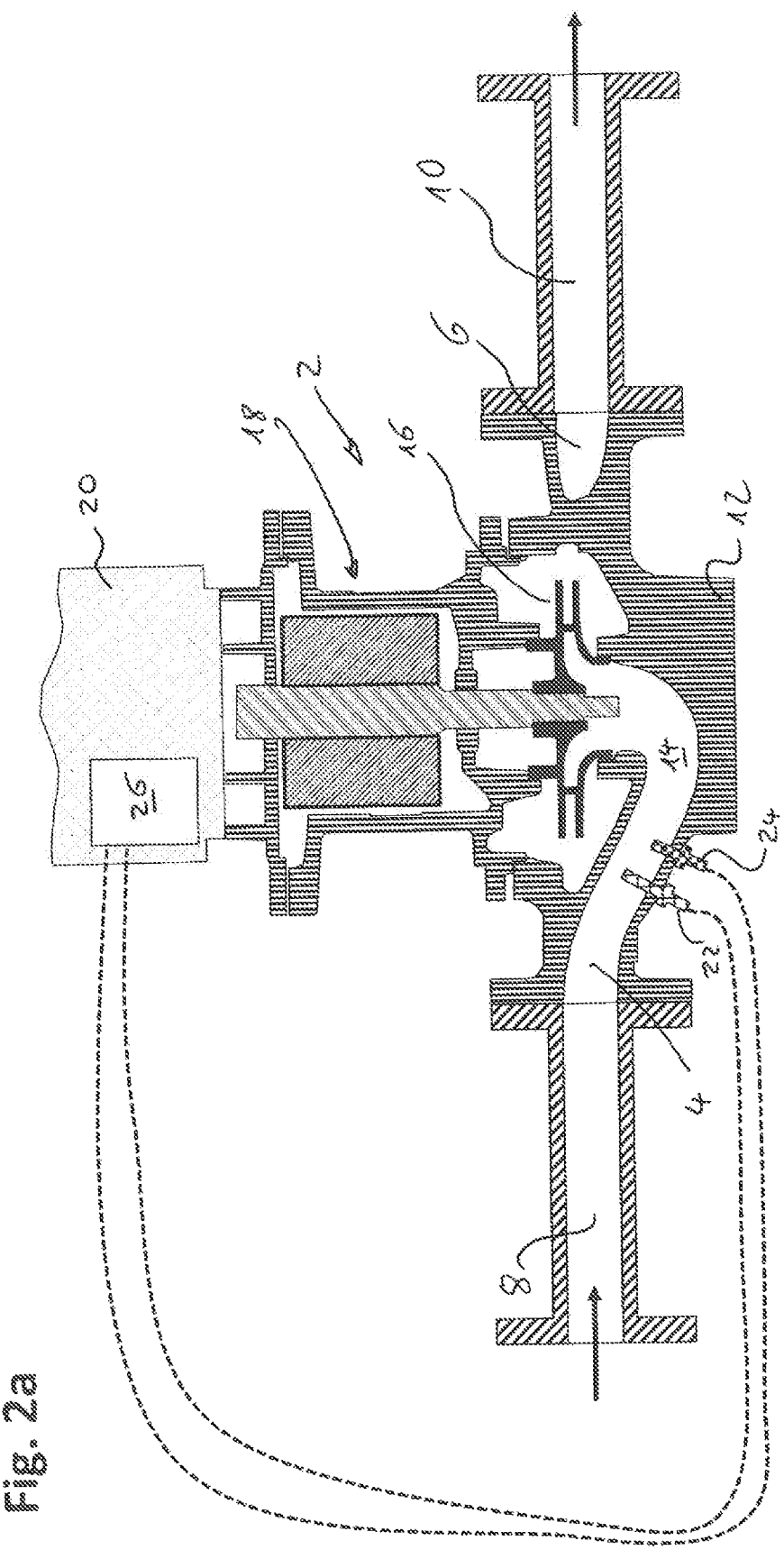
FIG. 2a is a schematic cross sectional view of a pump system according to a second embodiment of the invention.
Figure 2B:
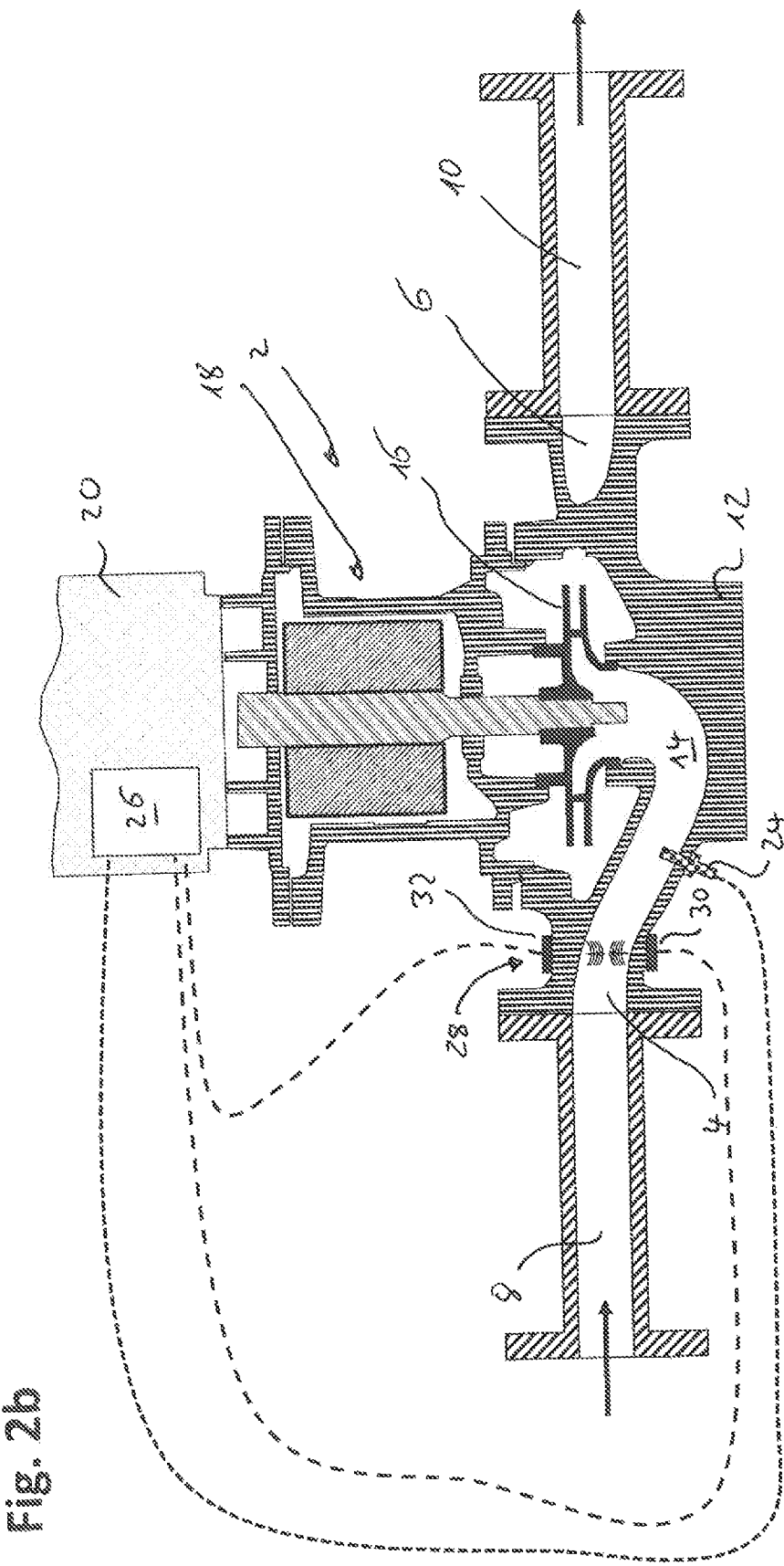

FIG. 2a shows a second embodiment similar to the first embodiment as shown in FIG. 1a. In the second embodiment the evaluation device 26 is integrated into the control device 20, i.e. the control electronics of the pump or drive motor 18. Furthermore, in this embodiment the control device 20 is arranged directly on the drive motor 18. The evaluation device 26 for example may be configured as a software module inside the control device or control electronics 20, respectively. However, it would also be possible to integrate a further electronics module forming the evaluation device 26 into the same housing as the control device 20. Also in the second embodiment the concentration sensor 22 and the temperature sensor 24 are connected to the evaluation device 26 which communicates with the further motor electronics of the control device 20 as described with reference to FIG. 1. Also for the second embodiment in an alternative solution as shown in FIG. 2b the alternative concentration sensor 28 as described with reference to FIG. 1b may be used. This means, also the concentration sensor 28 may be connected to an evaluation device 26 integrated into the control device 20.

Figure 3A:
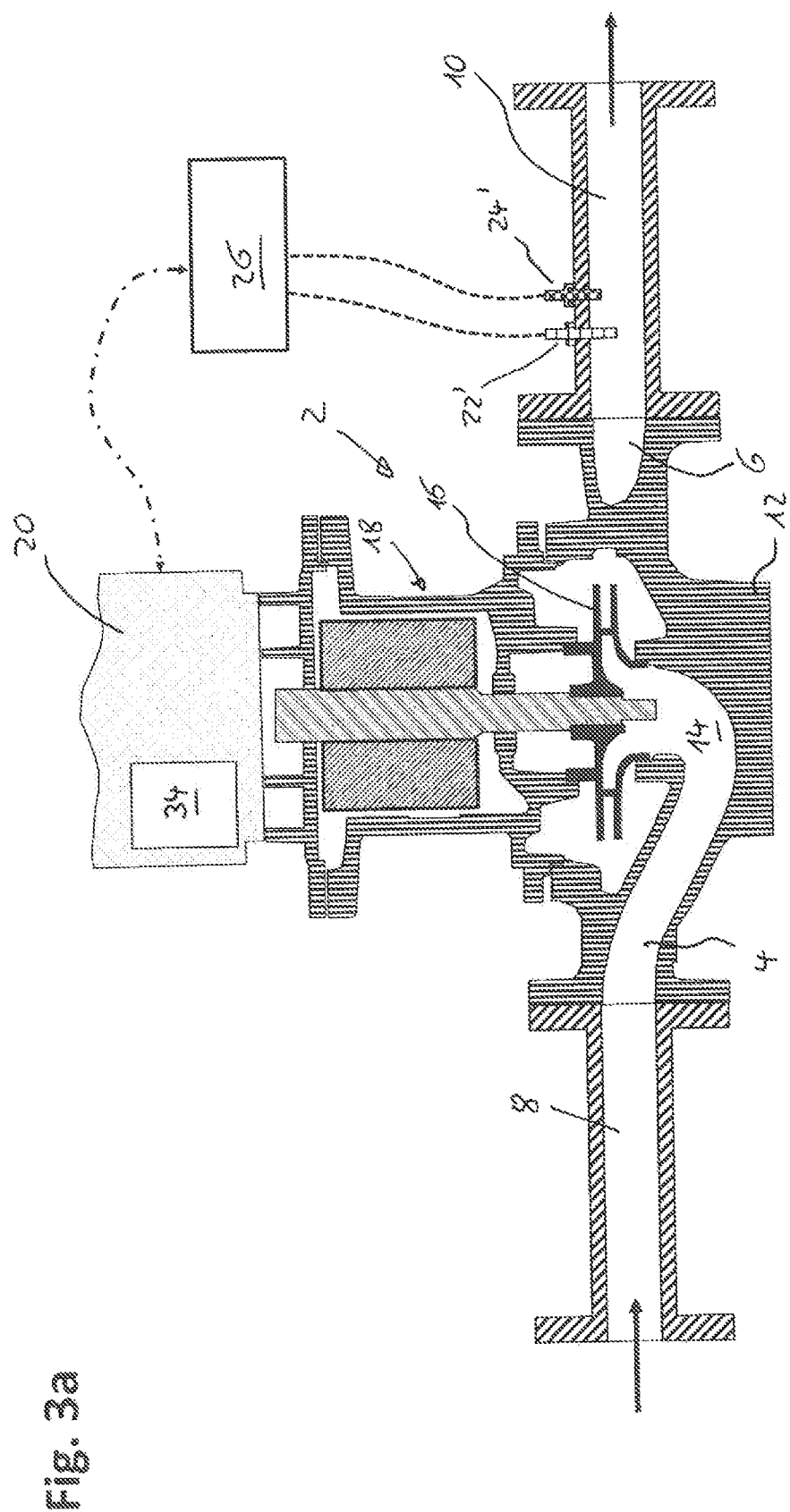
FIG. 3a is a schematic cross sectional view of a pump system according to a third embodiment of the invention.

FIG. 3a shows a third embodiment according to the invention which is similar to the embodiment shown in FIG. 1a, however, the concentration measurement device is realized as a separate system which can be integrated into an existing pump system such to retrofit existing pumps or pump systems. Instead of the concentration sensor 22 as shown in FIG. 1a and the temperature sensor 24 as shown in FIG. 1a in this third embodiment a concentration sensor 22' and a temperature sensor 24' are arranged in an outlet conduit 10 connected to the outlet 6 of the pump housing 12. This may be a direct connection or a connection via a further pipe or pipe element. These two sensors are connected to the evaluation device 26 forming an external electronic device which may be connected for communication with the control device 20 of the drive motor 18. Via this communication according to a further preferred solution the evaluation device 26 may additionally receive a flow signal from a flow detecting module 34 as a further parameter for the evaluation of the concentration. The flow detection module 34 may detect the flow for example from electrical values of the drive motor 18 and may be realized as a software module.

Also in this third embodiment, it would be possible to include the evaluation device 26 into the control device 20, for example as a software module in particular via a software update. Alternatively it would be possible to arrange the sensors 22' and 24' in the inlet conduit 8 instead of the outlet conduit 10 as shown.

FIG. 3b shows an alternative of the third embodiment as shown in FIG. 3a. In the solution shown in FIG. 3b the sensors 22' and 28' are arranged in the inlet conduit 8. However, it would also be possible to alternatively arrange these sensors in the outlet conduit 10 as shown in FIG. 3a. Furthermore, in this alternative solution the alternative concentration sensor 28' is used. The concentration sensor 28' corresponds to concentration sensor 28 as described with reference to FIG. 1b and FIG. 2b. In the solution shown in FIG. 3b the evaluation device 26 is integrated into the control device 20 corresponding to the embodiment shown in FIG. 2a and FIG. 2b. However, it would also be possible to use the concentration sensor 28 with an external evaluation device 26 as shown in FIG. 3a.

In all embodiments the ultrasonic sensors 22, 22', 28 and 28' may be combined flow/concentration sensors to measure both, flow and concentration in the liquid inside the flow path. The flow signal may be used as a further parameter by the evaluation device 26.

Figure 4:
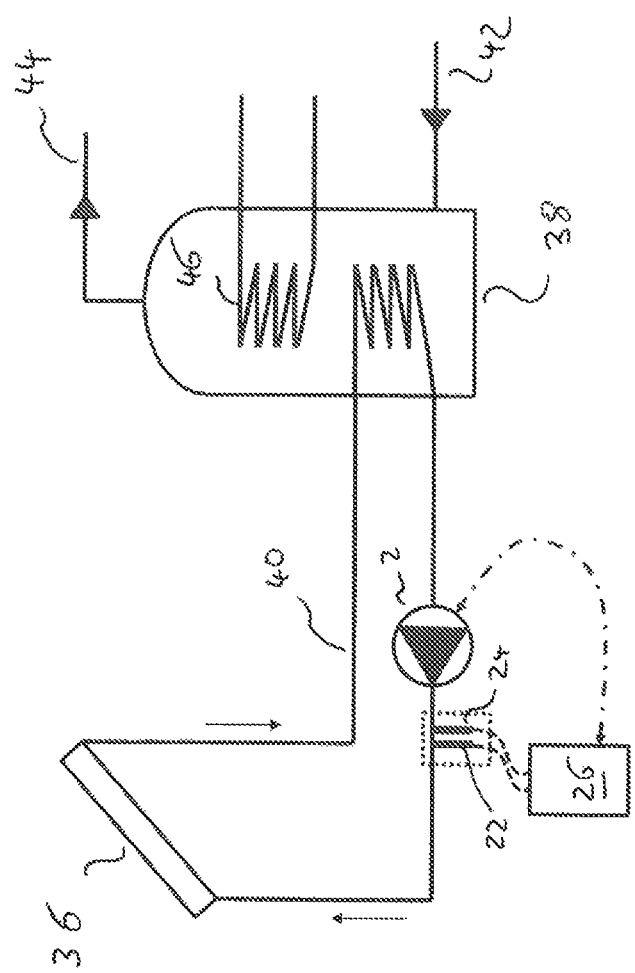
FIG. 4 is a schematic view of an example for a pump system according to the invention in form of a solar heating system.

FIG. 4 shows the use of a pump system as described before in a solar heating system. This system comprises a solar panel 36 connected to a hot water storage tank 38 via a closed hydraulic circuit 40. Inside this hydraulic circuit 40 there is circulating a liquid heat carrier, for example a water glycol mixture. For circulation there is provided a pump system as described with reference to FIGS. 1 to 3 having a pump 2 and a concentration measurement device having at least a concentration sensor 22, 22' and a temperature sensor 24, 24' connected to an evaluation device 26 communicating with the control device 20 of the pump 2. The arrangement of the sensors and the pump 2 as well as the evaluation device 26 may be as shown in FIGS. 1 to 3. The hot water tank 38 may have an inlet 42 for cold water and an outlet 44 for hot water. Furthermore, there are additional heating coils 46 connected to a boiler. In this arrangement the concentration measurement system as described before can detect the glycol concentration inside the liquid heat carrier and for example give an alarm if the concentration is below a predefined threshold. Furthermore, in such case for example the control device 20 may switch the pump 2 into a continuous operation mode to avoid freezing due to a concentration of glycol being below a required minimum.

Figure 5:
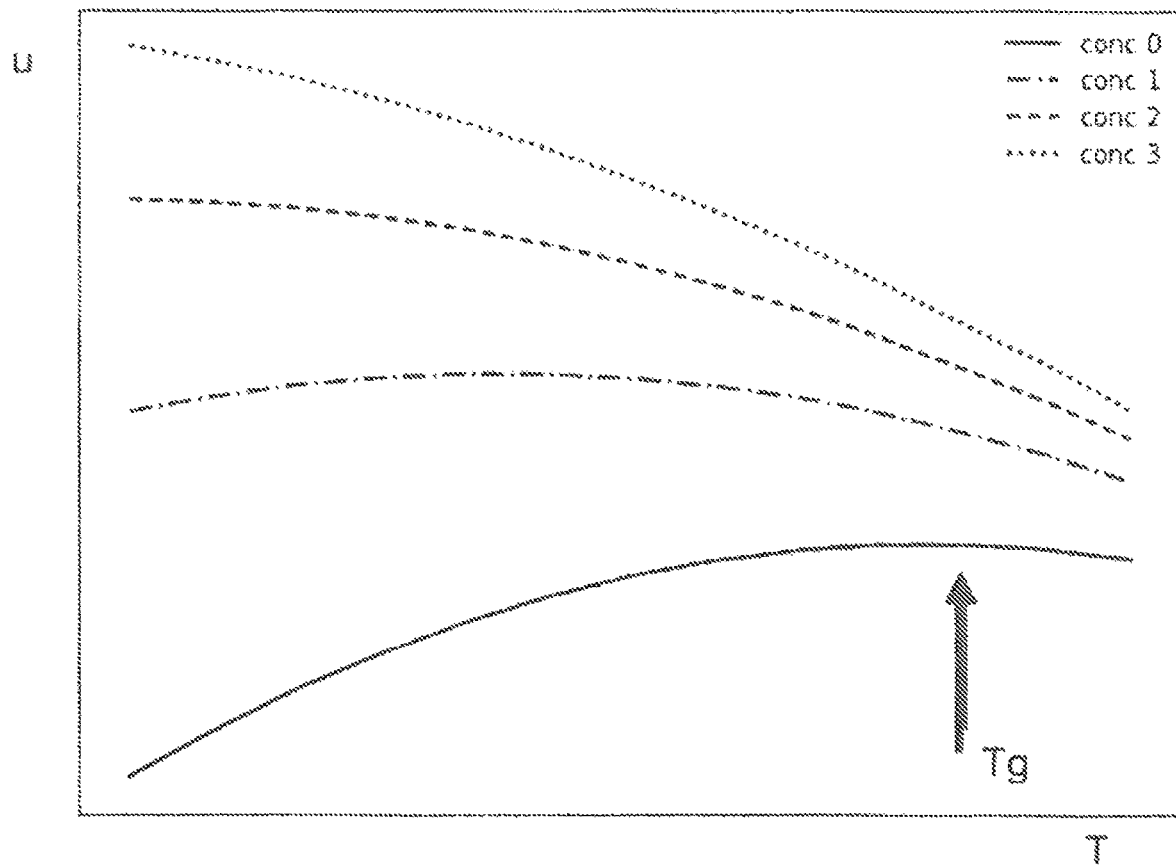
FIG. 5 is a diagram in which the speed of sound in the fluid is shown in dependence on the temperature, for different concentrations.

Signal courses for the signal speed within the flow path 14 are represented in FIG. 5 for four different concentrations conc0, conc1, conc2 and conc3. In FIG. 5, the speed u is plotted against temperature T. One can recognize that the speed differences between the individual concentrations decreases with an increasing temperature T. I.e. the measuring accuracy of the concentration decreases with an increasing temperature. A precise measurement is no longer possible from a temperature limit value $T_g$. For this reason, according to the invention, one envisages the evaluation device 26 preferably skipping the evaluation of the measuring result of the concentration sensor 22, 22' on exceeding the temperature $T_g$. The temperature may increase in certain operational conditions, and reduce again. The concentration measurement or evaluation of the reading of the concentration sensor 22, 22' is then for example only carried out by the evaluation device 26 for measurements at temperatures below the temperature limit value $T_g$.

While specific embodiments of the invention have been shown and described in detail to illustrate the application of the principles of the invention, it will be understood that the invention may be embodied otherwise without departing from such principles.

REFERENCE NUMERALS 2 pump
4 inlet
6 outlet
8 inlet conduit
10 outlet conduit
12 pump housing
14 flow path
16 impeller
18 electric motor
20 control device
22, 22' concentration sensor
24, 24' temperature sensor
26 evaluation device
28, 28' concentration sensor
30 transmitter
32 receiver
34 flow detecting module
36 solar panel
38 hot water storage tank
40 hydraulic circuit
42 inlet
44 outlet
46 heating coils
T temperature
$T_g$ temperature limit
conc concentration
u speed of sound

What is claimed is:

1. A pump system comprising:
a pump comprising a pump housing defining at least one flow path for a liquid, the at least one flow path being located inside the pump housing;
a concentration measurement device measuring a concentration in the liquid inside the flow path, wherein the concentration measurement device comprises a sensor arranged in or at the flow path, and a further signal source providing at least one further parameter and an evaluation device configured to evaluate the sensor readings, wherein:
the sensor is a concentration sensor configured to output sensor readings and is connected to the evaluation device;
a portion of the concentration sensor is adjacent to a portion of the at least one flow path;
the evaluation device is connected to the further signal source;
the further signal source comprises a temperature sensor configured to detect the at least one further parameter, the at least one further parameter being a temperature of the liquid inside the flow path; and
the evaluation device is configured to evaluate the sensor readings taking into account the at least one further parameter provided by the further signal source and to output a concentration in the liquid.

2. A pump system according to claim 1, wherein the temperature sensor is arranged in or at the flow path to detect the at least one further parameter of the liquid inside the flow path.

3. A pump system according to claim 2, wherein the sensor and the temperature sensor are arranged at a common position along the flow direction of the flow path with the sensor and the temperature sensor forming an integrated sensor.

4. A pump system according to claim 1, wherein the flow path is part of a flow path through the pump for the liquid pumped by the pump, wherein another portion of the concentration sensor is located in the flow path.

5. A pump system according to claim 1, wherein:
the flow path is arranged inside the pump housing;
another portion of the concentration sensor is configured to contact the liquid in the flow path; and
the pump comprises an impeller in the pump housing.

6. A pump system according to claim 1, wherein the concentration sensor comprises an ultrasound sensor, an optical sensor or a capacitive sensor.

7. A pump system according to claim 1, wherein the sensor comprises an ultrasound sensor configured as a combined flow and concentration sensor.

8. A pump system according to claim 1, wherein the evaluation device is configured to carry out an evaluation of a reading of the sensor only when the at least one further parameter is below a predefined maximum limit value and/or is above a predefined minimum limit value.

9. A pump system according to claim 1, wherein:
the pump comprises an electric drive motor with control electronics; and
the evaluation device is signal connected to the control electronics.

10. A pump system according to claim 9, wherein:
the control electronics forms the further signal source outputting the at least one further parameter.

11. A pump system according to claim 9, wherein the evaluation device is arranged inside an electronic housing containing control electronics of the pump and the evaluation device is integrated into the control electronics of the pump.

12. A pump system according to claim 1, wherein the at least one first sensor is arranged on an outlet side or on an inlet side of the pump.

13. A pump system according to claim 1, wherein the sensor is a concentration sensor configured to detect a glycol concentration.

14. A pump system according to claim 1, wherein the pump is a centrifugal pump configured as a circulator pump having a wet running electric drive motor.

15. A heating and/or cooling system comprising a pump system comprising:
a pump comprising a pump housing defining at least one flow path for a liquid, the at least one flow path being located in an interior of the pump housing;
a concentration measurement device measuring a concentration in the liquid inside the flow path, wherein the concentration measurement device comprises a sensor arranged in or at the flow path, and a further signal source providing at least one further parameter and an evaluation device configured to evaluate the sensor readings, wherein:
the sensor is a concentration sensor configured to output sensor readings and is connected to the evaluation device;
a portion of the concentration sensor is located adjacent to a portion of the at least one flow path;
the evaluation device is connected to the further signal source;

the further signal source comprises a temperature sensor configured to detect the at least one further parameter, the at least one further parameter being a temperature of the liquid inside the flow path; and the evaluation device is configured to evaluate the sensor readings taking into account the at least one further parameter provided by the further signal source and to output a concentration in the liquid.

16. A heating and/or cooling system according to claim 15, wherein:

the temperature sensor is arranged in or at the flow path to detect the at least one further parameter of the liquid inside the flow path; and the concentration sensor comprises an ultrasound sensor, an optical sensor or a capacitive sensor.

17. A solar heating system comprising:

at least one solar collector; and a pump system connected to the at least one solar collector, the pump system comprising:

a pump with at least one flow path for a liquid;

a concentration measurement device measuring a concentration in the liquid inside the flow path, wherein the concentration measurement device comprises a sensor arranged in or at the flow path, and a further signal source providing at least one further parameter and an evaluation device configured to evaluate the sensor readings, wherein:

the sensor is a concentration sensor configured to output sensor readings and is connected to the evaluation device;

the evaluation device is connected to the further signal source; and the evaluation device is configured to evaluate the sensor readings taking into account the further parameter provided by the further signal source and to output a concentration in the liquid.

* * * * *